US012735926B2

(12) United States Patent
Vergani

(10) Patent No.: US 12,735,926 B2
(45) Date of Patent: Sep. 15, 2026

(54) MAGNETICALLY ACTIVATED MECHANICAL DOORSTOP

(71) Applicant: VERUM ITALY S.R.L., Bulciago (IT)

(72) Inventor: Umberto Vergani, Bulciago (IT)

(73) Assignee: VERUM ITALY S.R.L., Bulciago (IT)

( * ) Notice: Subject to any disclaimer, the term of this patent is extended or adjusted under 35 U.S.C. 154(b) by 18 days.

(21) Appl. No.: 18/728,287

(22) PCT Filed: Jan. 2, 2023

(86) PCT No.: PCT/IT2023/050001
§ 371 (c)(1),
(2) Date: Jul. 11, 2024

(87) PCT Pub. No.: WO2023/139618
PCT Pub. Date: Jul. 27, 2023

(65) Prior Publication Data

US 2025/0084681 A1 Mar. 13, 2025

(30) Foreign Application Priority Data

Jan. 18, 2022 (IT) ........................ 102022000000740

(51) Int. Cl.
*E05C 19/16* (2006.01)
*E05B 47/00* (2006.01)
(Continued)

(52) U.S. Cl.
CPC .......... *E05C 19/163* (2013.01); *E05B 47/004* (2013.01); *E05B 63/20* (2013.01); *E05C 19/02* (2013.01)

(58) Field of Classification Search
CPC ............... E05B 47/004; E05B 47/0038; E05B 47/0046; E05B 63/20; E05B 2047/007;
(Continued)

(56) References Cited

U.S. PATENT DOCUMENTS 2,497,697 A * 2/1950 Smith ..................... E05C 17/56 292/144
2,690,349 A * 9/1954 Teetor ..................... E05C 19/16 292/251.5
(Continued)

FOREIGN PATENT DOCUMENTS

BE 1025390 A1 * 2/2019 ........... E05C 19/168
BE 1026669 A1 * 4/2020 ........... E05C 19/168
(Continued)

OTHER PUBLICATIONS

KR2021001438U Espacenet machine translation claims and description (Year: 2025).*
(Continued)

*Primary Examiner* — Steven A Tullia
(74) *Attorney, Agent, or Firm* — Chambliss, Bahner & Stophel, P.C.; Stephen D. Adams

(57) ABSTRACT

A magnetically activated mechanical doorstop (1) is described comprising: a pin (3) installed in a hollow element (5) operatively connected to a door (7); a magnetic element (9) operatively connected to a jamb (11) and designed to attract and block the pin (3) by magnetic force when the door (7) is in its closed operative position, the magnetic element (9) being furthermore designed to bring the door (7) to its open operating position when the magnetic attraction between the pin (3) and the magnetic element (9) ceases and the pin (3) falls back by gravity into the hollow element (5), in which the pin (3) is free to move horizontally and vertically in the hollow element (5), and the magnetic element (9) installed in the jamb (11) has a horizontally elongated recess (13) suitable for doors with opening to push and pull in both directions, the recess (13) being able to house the pin (3) during the closing phase of the door (7).

18 Claims, 6 Drawing Sheets

(51) Int. Cl.
*E05B 63/20* (2006.01)
*E05C 19/02* (2006.01)

(58) Field of Classification Search
CPC ........ E05C 19/163; E05C 19/02; E05C 19/16; Y10T 292/11; Y10T 292/705
See application file for complete search history.

(56) References Cited

U.S. PATENT DOCUMENTS

| | | | | | |
|---|---|---|---|---|---|
| 2,719,050 | A * | 9/1955 | Teetor | E05C 19/16 292/144 |
| 3,155,409 | A * | 11/1964 | Schlissel | E05C 19/16 292/251.5 |
| 3,258,285 | A * | 6/1966 | Smith | E05C 17/56 292/251.5 |
| 3,579,934 | A * | 5/1971 | Pietsch | E05C 19/16 49/394 |
| 3,736,779 | A * | 6/1973 | Pratt | E05B 47/0038 70/276 |
| 4,026,588 | A * | 5/1977 | Bisbing | E05C 19/165 292/251.5 |
| 4,155,576 | A * | 5/1979 | Kennon | E05C 19/16 49/394 |
| 4,306,744 | A * | 12/1981 | Krehbiel | E05C 19/166 292/144 |
| 4,434,524 | A * | 3/1984 | Gilchrist | E05F 15/60 16/280 |
| 5,664,449 | A * | 9/1997 | Sedley | E05B 47/0041 70/38 C |
| 5,925,861 | A * | 7/1999 | Fromberg | E05B 15/1621 200/61.67 |
| 6,561,555 | B1 * | 5/2003 | Millard | E05C 19/166 292/341.16 |
| 7,567,159 | B2 * | 7/2009 | Macken | E05C 19/16 16/49 |
| 8,562,035 | B2 * | 10/2013 | Burdenko | E05B 47/026 292/340 |
| 9,404,295 | B2 * | 8/2016 | Baczuk | E05C 1/10 |
| 9,572,410 | B2 * | 2/2017 | Fiedler | E05B 37/12 |
| 10,626,636 | B2 * | 4/2020 | Fiedler | E05B 65/52 |
| 11,187,019 | B2 * | 11/2021 | Sellar | E05C 17/56 |
| 2011/0148126 | A1 | 6/2011 | Macernis | |
| 2014/0191515 | A1 | 7/2014 | Gorlewski | |
| 2015/0368942 | A1 | 12/2015 | Baczuk et al. | |
| 2017/0175427 | A1 * | 6/2017 | Wirth | E05B 47/004 |
| 2025/0084681 | A1 * | 3/2025 | Vergani | E05B 47/004 |

FOREIGN PATENT DOCUMENTS

| | | | | | |
|---|---|---|---|---|---|
| CH | 383822 | A | | 10/1964 | |
| CN | 2399495 | Y | * | 10/2000 | E05F 5/06 |
| CN | 108756524 | A | * | 11/2018 | E05B 47/0038 |
| CS | 261915 | B1 | * | 2/1989 | B23Q 3/15 |
| DE | 4427026 | A1 | * | 8/1995 | E05B 65/464 |
| DE | 10336433 | A1 | * | 3/2005 | E05C 17/56 |
| DE | 202005016584 | U1 | * | 1/2006 | E05C 19/16 |
| DE | 10213722 | B4 | * | 5/2007 | E05C 19/168 |
| DE | 102006012096 | A1 | | 9/2007 | |
| DE | 202007017138 | U1 | * | 4/2008 | H01F 7/0263 |
| DE | 102007037775 | A1 | * | 2/2009 | E05F 5/06 |
| DE | 102017002647 | A1 | * | 9/2018 | E05B 63/20 |
| DE | 102019205155 | A1 | * | 10/2019 | E06B 3/367 |
| EP | 45197 | A | * | 2/1982 | E05B 47/00 |
| EP | 2535490 | A2 | * | 12/2012 | E05C 17/56 |
| FR | 2897379 | A1 | * | 8/2007 | E05C 19/163 |
| GB | 191315684 | A | * | 7/1914 | E05B 47/004 |
| GB | 1268362 | A | * | 3/1972 | E05B 47/004 |
| GB | 1530591 | A | * | 11/1978 | E05C 19/16 |
| GB | 1561722 | A | * | 2/1980 | H01P 1/125 |
| GB | 2085956 | A | * | 5/1982 | E05C 19/168 |
| GB | 2186625 | A | * | 8/1987 | A45C 13/1069 |
| GB | 2254644 | A | * | 10/1992 | E05C 19/16 |
| GB | 2470120 | A | * | 11/2010 | E05B 17/0033 |
| IT | 201900001531 | A1 | * | 8/2020 | E05C 19/163 |
| IT | 202100007634 | A1 | * | 6/2021 | E05C 19/16 |
| IT | 202100000713 | U1 | * | 8/2022 | |
| JP | H08277678 | A | * | 10/1996 | E05F 5/02 |
| JP | H10140927 | A | * | 5/1998 | E05F 5/02 |
| JP | 2581479 | Y2 | * | 9/1998 | E05C 19/02 |
| JP | 3452260 | B2 | * | 9/2003 | E05C 17/56 |
| JP | 2006028890 | A | * | 2/2006 | E05F 5/02 |
| JP | 2010095902 | A | * | 4/2010 | E05C 17/56 |
| JP | 2010285739 | A | * | 12/2010 | E05F 5/02 |
| KR | 20090007768 | U | * | 7/2009 | E05F 5/06 |
| KR | 20180002452 | A | | 1/2018 | |
| KR | 102008849 | B1 | * | 8/2019 | E05C 19/16 |
| KR | 20210001438 | U | * | 6/2021 | F16B 5/0664 |
| KR | 20230014960 | A | * | 1/2023 | E05C 1/004 |
| WO | WO-0136771 | A1 | * | 5/2001 | E05F 5/00 |
| WO | WO-2019159152 | A1 | * | 8/2019 | E05C 19/16 |

OTHER PUBLICATIONS

International Search Report and Written Opinion for PCT/IT2023/050001, date of mailing Jul. 27, 2023, 10 pages.

* cited by examiner

MAGNETICALLY ACTIVATED MECHANICAL DOORSTOP

BACKGROUND OF THE INVENTION

The present invention refers to a magnetically activated mechanical doorstop.

US-A1-2014/191515 discloses a mechanical doorstop according to the prior art.

SUMMARY OF THE INVENTION

Object of the present invention is providing a magnetically activated mechanical doorstop which allows the door to be locked in one direction in a clear and precise manner, while still leaving the possibility of adjustment.

Another object of the present invention is allowing the element to be correctly repositioned in the jamb in the event of excessive resistance from the mechanical doorstop during the door opening phase.

The above and other objects and advantages of the invention, as will appear from the following description, are achieved with a magnetically activated mechanical doorstop as described in claim 1. Preferred embodiments and non-trivial variants of the present invention form the subject matter of the dependent claims.

It is understood that all attached claims form an integral part of the present description.

It will be immediately obvious that innumerable variations and modifications may be made to what has been described (for example relating to shape, dimensions, arrangements and parts with equivalent functions) without departing from the scope of protection of the invention as appears from the attached claims.

BRIEF DESCRIPTION OF THE DRAWINGS

The present invention will be better described by some preferred embodiments, provided by way of non-limiting example, with reference to the attached drawings, in which.

DETAILED DESCRIPTION OF PREFERRED EMBODIMENTS

Figure 1:
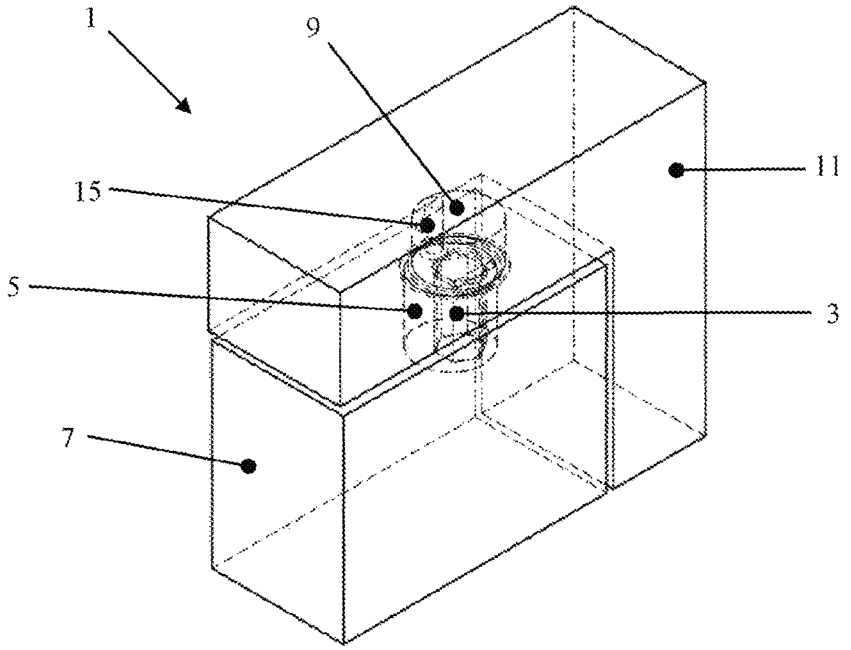
FIG. 1 shows a perspective view of an embodiment of the magnetically activated mechanical doorstop according to the present invention.
Figure 2:
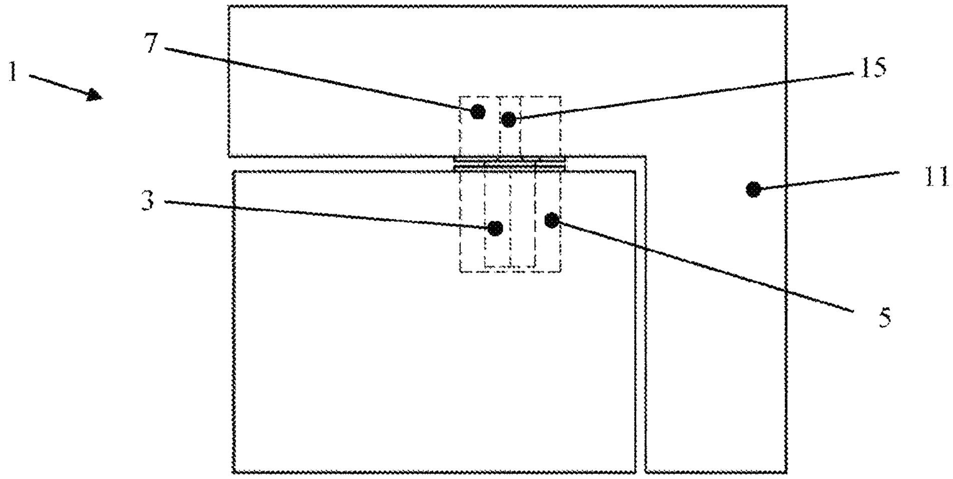
FIG. 2 shows a front view of an embodiment of the magnetically activated mechanical doorstop according to the present invention.
Figure 3:
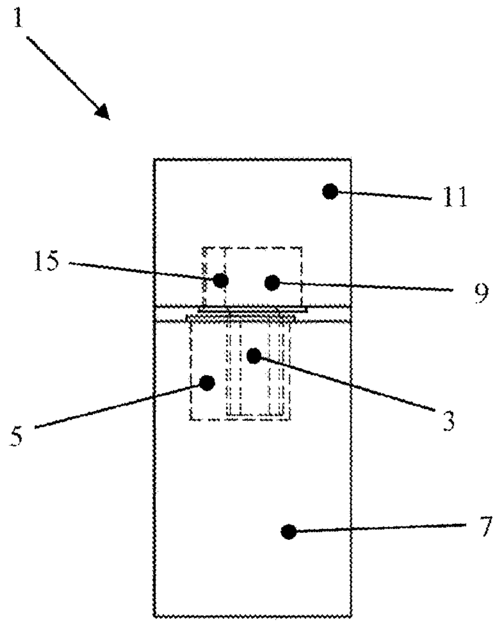
FIG. 3 shows a side view of an embodiment of the magnetically activated mechanical doorstop according to the present invention.
Figure 4:
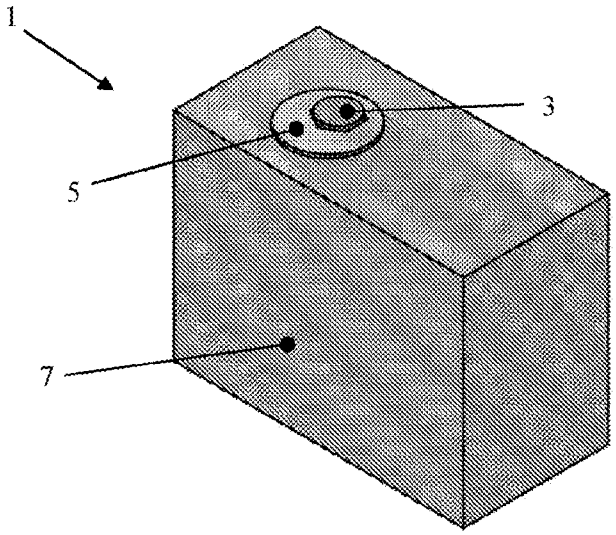
FIG. 4 shows a perspective view of one embodiment of the hollow member and pin of the magnetically activated mechanical door stop installed in the door according to the present invention.
Figure 5:
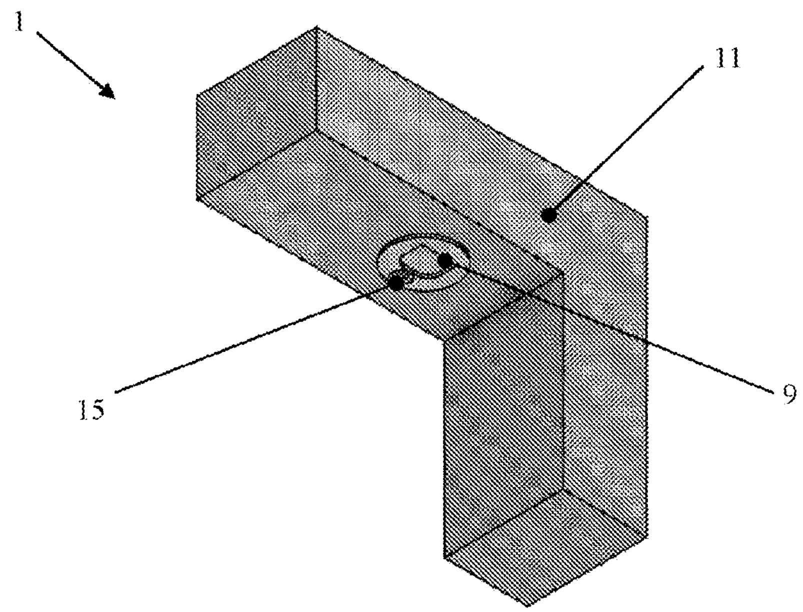
FIG. 5 shows a perspective view of an embodiment of the magnetic element of the magnetically activated mechanical doorstop installed in the jamb according to the present invention.
Figure 6:
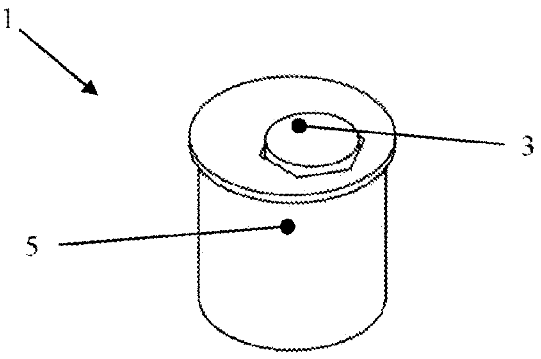
FIG. 6 shows a detail of an embodiment of the hollow element and of the pin of the magnetically activated mechanical doorstop according to the present invention.
Figure 7:
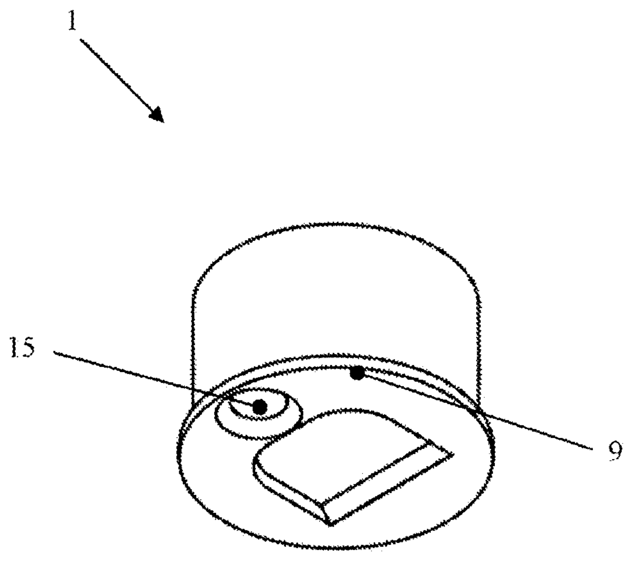
FIG. 7 shows a detail of an embodiment of the magnetic element of the magnetically activated mechanical doorstop according to the present invention.
Figure 8:
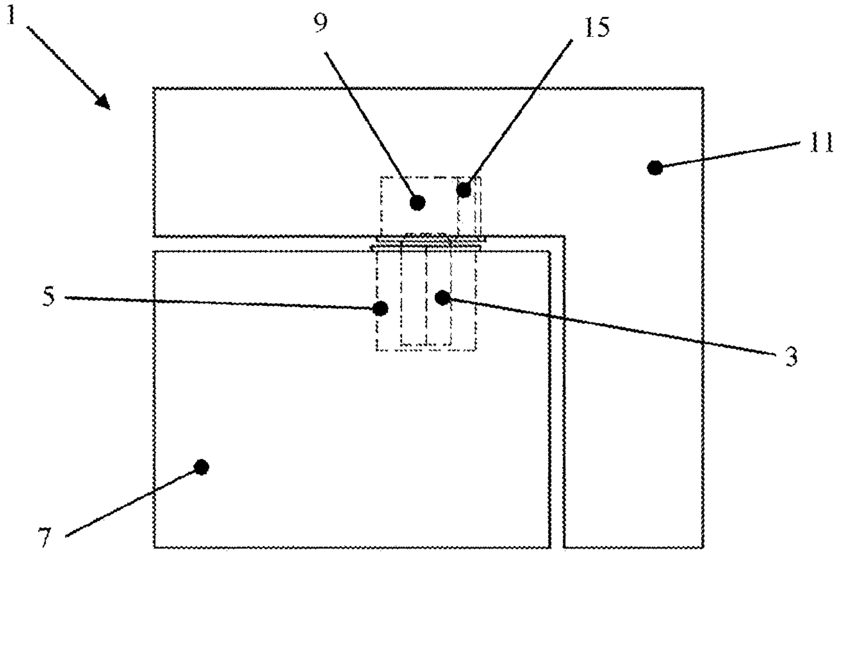
FIG. 8 shows a front view of an embodiment of the magnetically activated mechanical doorstop for doors with push and pull opening in both directions according to the present invention.
Figure 9:
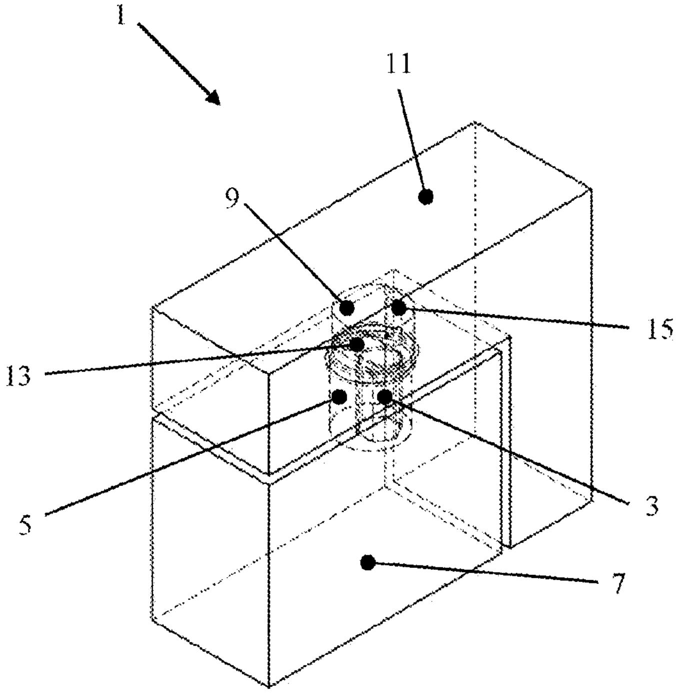
FIG. 9 shows a perspective view of an embodiment of the magnetically activated mechanical doorstop for doors with push and pull opening in both directions according to the present invention.
Figure 10:
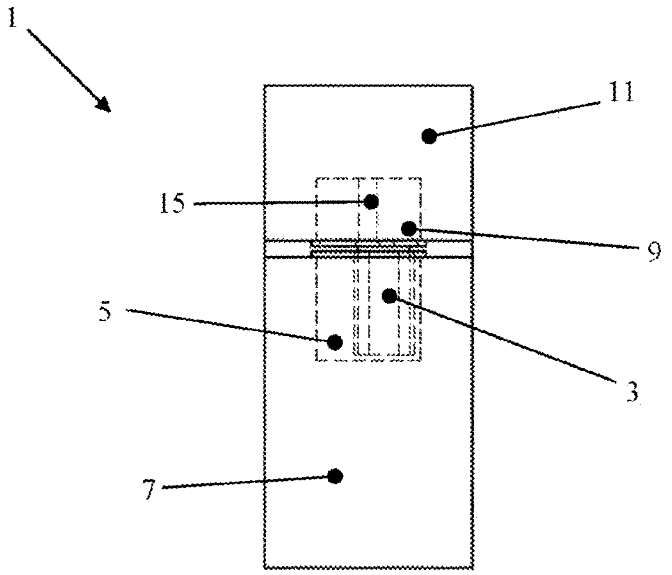
FIG. 10 shows a side view of an embodiment of the magnetically activated mechanical doorstop for doors with push and pull opening in both directions according to the present invention.
Figure 11:
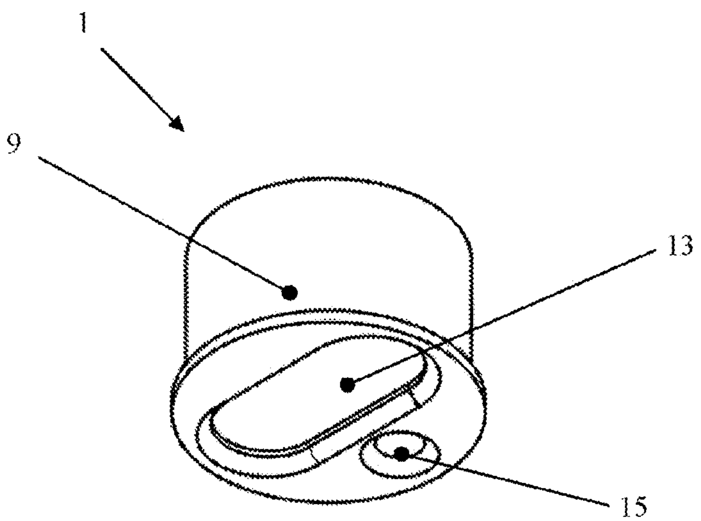
FIG. 11 shows a detail of an embodiment of the magnetic element with the recess for doors with push and pull opening in both directions of the magnetically activated mechanical doorstop according to the present invention.
Figure 12:
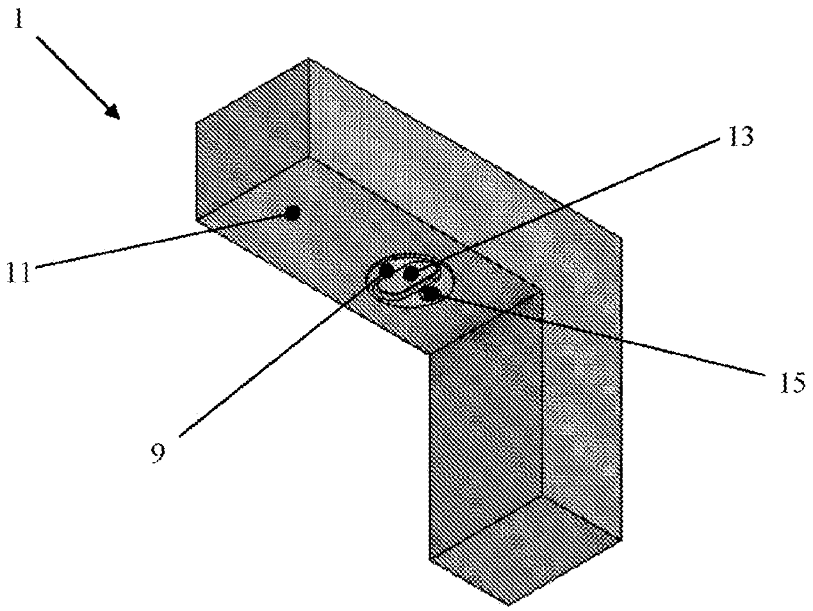
FIG. 12 shows a perspective view of an embodiment of the magnetic element of the magnetically activated mechanical doorstop for doors with push and pull opening in both directions installed in the jamb according to the present invention.

The present invention consists of a magnetically activated mechanical doorstop 1 comprising:

- at least one pin 3 installed in a hollow element 5, the hollow element 5 being operatively connected to a door 7;
- at least one magnetic element 9 operatively connected to a jamb 11.

Advantageously, the magnetic element 9 is designed to attract and block the pin 3 by magnetic force when the door 7 is in its closed operating position.

Furthermore, the magnetic element 9 is designed to bring the door 7 to its open operating position when the magnetic attraction between the pin 3 and the magnetic element 9 ceases; subsequently, the pin 3 falls back by force of gravity in the hollow element 5.

The magnetically activated mechanical doorstop 1 according to the present invention consists of two round elements for which the same hole with a diameter of 20 mm is made in the door 7 and in the jamb 11.

In particular, a cylindrical magnetic pin 3 is inserted in the hollow element 5 in the door 7: this pin 3 is also free to move horizontally and vertically inside the hollow element 5.

Advantageously, by means of an Allen key, it is possible to rotate the hollow element 5 by adjusting it both laterally and in depth.

Furthermore, in a variation of the magnetically activated mechanical doorstop of the invention, the magnetic element 9 has a recess 13 externally designed to attract and block the pin 3 present in the door 7 panel when it is closing for doors with push and pull opening in both directions.

Advantageously, the magnetically activated mechanical doorstop 1 therefore allows the door 7 to be locked in one direction in a clear and precise manner, while still leaving the possibility of adjustment.

During assembly, excessive resistance will indicate incorrect installation, thus allowing the magnetic element 9 to be correctly repositioned in the jamb 11.

Furthermore, the magnetic element 9 can be operatively connected to the jamb 11 by means of at least one screw 15.

What is claimed is:

1. A magnetically activated mechanical doorstop for installation on and use in connection with a door and door jamb, the doorstop comprising:

- a hollow element configured for installation in a door by forming a single cylindrical bore in the door, wherein the hollow element is receivable within the bore without additional structural support components, the hollow element defining a cylindrical interior chamber opening toward the door jamb;

a cylindrical pin disposed within the cylindrical interior chamber and having a diameter allowing the pin to freely move both vertically and horizontally within the chamber under influence of magnetic attraction and gravity alone, wherein the pin comprises magnetically attractable material;

a permanent magnet configured to be mounted to the door jamb in a position aligned with the hollow element when the door is closed, the permanent magnet having a horizontally elongated recess formed therein;

wherein, during operation, the pin automatically lifts from a resting position in the cylindrical chamber when the door closes and the permanent magnet attracts the pin into the recess, and the pin automatically falls by gravity when the door opens and magnetic attraction ceases.

2. The mechanical doorstop of claim 1, characterized in that the mechanical doorstop is designed to be adjustable allowing to change its position after installation.

3. The mechanical doorstop of claim 1, characterized in that the permanent magnet is operatively connected to the jamb by means of at least one screw.

4. The mechanical doorstop of claim 1, wherein the permanent magnet comprises a neodymium magnet or a ferrite magnet configured to generate sufficient magnetic attraction force to lift and retain the pin.

5. The mechanical doorstop of claim 1, wherein the hollow element is mounted within a top edge of the door and opens toward the jamb when the door is in the closed operating position.

6. The mechanical doorstop of claim 1, wherein the permanent magnet is configured to generate a magnetic field sufficient to lift the pin vertically against gravity when the door approaches the closed operating position, and wherein the magnetic attraction force ceases to retain the pin when the door is opened beyond a threshold angle.

7. The mechanical doorstop of claim 1, wherein the hollow element comprises a cylindrical chamber, and wherein the pin has a cylindrical body with a diameter smaller than an interior diameter of the cylindrical chamber to permit free horizontal and vertical movement.

8. The mechanical doorstop of claim 1, wherein the pin comprises a magnetically attractable material and does not itself generate a magnetic field, and wherein all magnetic attraction force originates from the permanent magnet in the jamb.

9. The mechanical doorstop of claim 1, wherein the horizontally elongated recess has a length of at least 2 centimeters to accommodate horizontal movement of the pin during door operation.

10. The mechanical doorstop of claim 1, wherein the permanent magnet and the pin are configured such that the pin automatically lifts from a resting position at a bottom of the hollow element to engage the recess when the door moves to within 5 centimeters of the closed operating position.

11. The mechanical doorstop of claim 1, wherein the pin has a mass between 5 grams and 50 grams, and wherein the permanent magnet generates a magnetic field strength sufficient to lift the pin against gravitational force.

12. The mechanical doorstop of claim 1, wherein the permanent magnet is adjustably positioned on the jamb to permit alignment adjustment relative to the hollow element after initial installation.

13. The mechanical doorstop of claim 1, wherein the recess in the permanent magnet has beveled sides to facilitate smooth entry and exit of the pin during door closing and opening operations.

14. The mechanical doorstop of claim 1, wherein the door is configured to swing in both push and pull directions, and wherein the horizontally elongated recess accommodates the pin regardless of the direction of door approach.

15. The mechanical doorstop of claim 1, further comprising a plurality of pins installed in respective hollow elements along the door, and a corresponding plurality of permanent magnets installed along the jamb.

16. The mechanical doorstop of claim 1, wherein the hollow element includes an open bottom end allowing the pin to be inserted or removed from below after installation of the hollow element in the door.

17. The mechanical doorstop of claim 1, wherein engagement of the pin with the recess creates an audible click sound providing tactile feedback that the door has reached the closed operating position.

18. A method of automatically retaining a door in a closed position using magnetic attraction force, the method comprising:

providing a permanent magnet mounted to a jamb, the permanent magnet having a horizontally elongated recess;

providing a pin installed in a hollow element in a door, wherein the pin is structurally separate from the permanent magnet and is free to move both horizontally and vertically within the hollow element;

closing the door toward the jamb such that the pin approaches the permanent magnet;

allowing the permanent magnet to generate magnetic attraction force that attracts and lifts the pin vertically against gravitational force;

receiving the pin in the horizontally elongated recess where the pin is retained by the magnetic attraction force to hold the door in the closed position; and opening the door such that the pin moves out of magnetic attraction range, causing the magnetic attraction force to cease and the pin to fall by gravity back into the hollow element, thereby automatically releasing the door.

* * * * *